(12) United States Patent
Coli et al.

(10) Patent No.: US 9,121,257 B2
(45) Date of Patent: Sep. 1, 2015

(54) MOBILE, MODULAR, ELECTRICALLY POWERED SYSTEM FOR USE IN FRACTURING UNDERGROUND FORMATIONS

(71) Applicant: EVOLUTION WELL SERVICES, LLC, The Woodlands, TX (US)

(72) Inventors: Todd Coli, Calgary (CA); Eldon Schelske, Calgary (CA)

(73) Assignee: Evolution Well Services, LLC, The Woodlands, TX (US)

( * ) Notice: Subject to any disclaimer, the term of this patent is extended or adjusted under 35 U.S.C. 154(b) by 0 days.

(21) Appl. No.: 14/541,993

(22) Filed: Nov. 14, 2014

(65) Prior Publication Data
US 2015/0068724 A1    Mar. 12, 2015

Related U.S. Application Data

(63) Continuation of application No. 13/441,334, filed on Apr. 6, 2012.

(60) Provisional application No. 61/472,861, filed on Apr. 7, 2011.

(51) Int. Cl.
*E21B 43/26* (2006.01)
*E21B 43/00* (2006.01)
*B62D 63/06* (2006.01)
(Continued)

(52) U.S. Cl.
CPC ............. *E21B 43/00* (2013.01); *B62D 63/06* (2013.01); *E21B 27/00* (2013.01); *E21B 41/0085* (2013.01); *E21B 43/26* (2013.01)

(58) Field of Classification Search
CPC ........................................ E21B 43/26
USPC ................. 166/308.1, 177.5, 75.11
See application file for complete search history.

(56) References Cited

U.S. PATENT DOCUMENTS

| | | |
|---|---|---|
| 3,113,620 A | 12/1963 | Hemminger |
| 3,901,313 A | 8/1975 | Doniguian et al. |
| 4,060,988 A | 12/1977 | Arnold |

(Continued)

FOREIGN PATENT DOCUMENTS

| | | |
|---|---|---|
| CA | 2279320 A1 | 4/2000 |
| CA | 2547970 A1 | 12/2006 |

(Continued)

OTHER PUBLICATIONS

International Search Report and Written Opinion of International Searching Authority issued Sep. 13, 2012 in International Application No. PCT/IB2012/000832 filed Apr. 6, 2012.

(Continued)

*Primary Examiner* — Brad Harcourt
(74) *Attorney, Agent, or Firm* — Greenberg Traurig, LLP

(57) ABSTRACT

The present invention provides a method and system for providing on-site electrical power to a fracturing operation, and an electrically powered fracturing system. Natural gas can be used to drive a turbine generator in the production of electrical power. A scalable, electrically powered fracturing fleet is provided to pump fluids for the fracturing operation, obviating the need for a constant supply of diesel fuel to the site and reducing the site footprint and infrastructure required for the fracturing operation, when compared with conventional systems.

22 Claims, 12 Drawing Sheets

(51) Int. Cl.
  *E21B 41/00* (2006.01)
  *E21B 27/00* (2006.01)

(56) References Cited

U.S. PATENT DOCUMENTS

| | | | |
|---|---|---|---|
| 4,471,619 A | 9/1984 | Nolley, Jr. | |
| 4,557,325 A | 12/1985 | Gall | |
| 4,694,907 A | 9/1987 | Stahl et al. | |
| 5,184,456 A | 2/1993 | Rumford et al. | |
| 5,248,005 A | 9/1993 | Mochizuki | |
| 5,334,898 A | 8/1994 | Skybyk | |
| 6,161,386 A | 12/2000 | Lokhandwala | |
| 6,167,965 B1 | 1/2001 | Bearden et al. | |
| 6,193,402 B1 | 2/2001 | Grimland | |
| 6,265,786 B1 | 7/2001 | Bosley et al. | |
| 6,298,652 B1 | 10/2001 | Mittricker et al. | |
| 6,325,142 B1 | 12/2001 | Bosley et al. | |
| 6,495,929 B2 | 12/2002 | Bosley et al. | |
| 6,773,238 B1 | 8/2004 | Sprakel | |
| 6,907,737 B2 | 6/2005 | Mittricker et al. | |
| 7,114,322 B2 | 10/2006 | Yamanaka et al. | |
| 7,128,142 B2 | 10/2006 | Heathman et al. | |
| 7,562,708 B2 | 7/2009 | Cogliandro et al. | |
| 7,581,379 B2 | 9/2009 | Yoshida et al. | |
| 7,589,379 B2 | 9/2009 | Amaratunga et al. | |
| 7,608,935 B2 | 10/2009 | Scherzer | |
| 7,669,657 B2 | 3/2010 | Symington et al. | |
| 7,677,316 B2 | 3/2010 | Butler et al. | |
| 7,681,647 B2 | 3/2010 | Mudunuri et al. | |
| 7,683,499 B2 | 3/2010 | Saucier | |
| 7,717,193 B2 | 5/2010 | Egilsson et al. | |
| 7,828,057 B2 | 11/2010 | Kearl et al. | |
| 7,832,257 B2 | 11/2010 | Weightman et al. | |
| 7,845,413 B2 | 12/2010 | Shampine et al. | |
| 7,908,230 B2 | 3/2011 | Bailey et al. | |
| 7,926,562 B2 | 4/2011 | Poitzsch et al. | |
| 7,958,716 B2 | 6/2011 | Zeigenfuss | |
| 2003/0178195 A1 | 9/2003 | Agee et al. | |
| 2006/0054318 A1* | 3/2006 | Sarada | 166/266 |
| 2006/0278394 A1 | 12/2006 | Stover | |
| 2007/0029090 A1 | 2/2007 | Andreychuk et al. | |
| 2007/0125544 A1 | 6/2007 | Robinson et al. | |
| 2007/0204991 A1 | 9/2007 | Loree et al. | |
| 2007/0277982 A1 | 12/2007 | Shampine et al. | |
| 2008/0017369 A1 | 1/2008 | Sarada | |
| 2008/0217024 A1 | 9/2008 | Moore | |
| 2008/0264625 A1 | 10/2008 | Ochoa | |
| 2008/0264640 A1 | 10/2008 | Eslinger | |
| 2008/0264649 A1 | 10/2008 | Crawford | |
| 2009/0084558 A1 | 4/2009 | Bloom | |
| 2009/0095482 A1 | 4/2009 | Surjaatmadja | |
| 2009/0101410 A1 | 4/2009 | Egilsson et al. | |
| 2009/0120635 A1 | 5/2009 | Neal | |
| 2009/0194280 A1 | 8/2009 | Gil et al. | |
| 2009/0308602 A1 | 12/2009 | Bruins et al. | |
| 2010/0000221 A1 | 1/2010 | Pfefferle | |
| 2010/0071899 A1 | 3/2010 | Coquilleau et al. | |
| 2010/0089589 A1 | 4/2010 | Crawford et al. | |
| 2010/0310384 A1* | 12/2010 | Stephenson et al. | 417/53 |
| 2011/0030951 A1 | 2/2011 | Irvine et al. | |
| 2011/0036584 A1 | 2/2011 | Weightman et al. | |
| 2011/0067882 A1 | 3/2011 | Yeriazarian et al. | |
| 2011/0179799 A1 | 7/2011 | Allam et al. | |
| 2011/0198089 A1 | 8/2011 | Panga et al. | |
| 2012/0085541 A1 | 4/2012 | Love et al. | |
| 2012/0181015 A1 | 7/2012 | Kajaria et al. | |

FOREIGN PATENT DOCUMENTS

| | | |
|---|---|---|
| CA | 2514658 A1 | 2/2007 |
| CA | 2653069 A1 | 12/2007 |
| CA | 2678638 A1 | 11/2008 |
| CA | 2684598 A1 | 2/2009 |
| CA | 2639418 C | 3/2009 |
| CA | 2700385 A1 | 4/2009 |
| CA | 2679812 A1 | 3/2010 |
| GB | 976279 | 11/1964 |
| GB | 2404253 A | 1/2005 |
| WO | 2007141715 A1 | 12/2007 |
| WO | 2012137068 A1 | 10/2012 |

OTHER PUBLICATIONS

Podsada, Janice. The Hartford Courant. "Pratt & Whitney Celebrates Completion of 50th FT8 MobilePac Power Generator." Jul. 18, 2011.

Powerpoint presentation: TM2500 & TM2500+ Mobile Gas Turbine Generator; retrieved Oct. 9, 2014 from www.scawa.com/files/SCA_TM2500.pdf.

Toshiba G9/H9 Adjustable Speed Drive Engineering Specification: ASD Applications and Marketing. Feb. 13, 2008.

International Search Report and Written Opinion of International Searching Authority issued Jan. 8, 2014 in International Application No. PCT/CA2013/000845.

Gardner Denver, Inc., GD-2500 Quintuplex Well Service Pump, 2003, 2 pages, USA.

Gardner Denver, Inc., Well Servicing Pump, Model GD-25000 Quintuplex, Power End Parts List, 300FWF997 Rev G, Apr. 2007, 15 pages, Tulsa, OK USA.

Gardner Denver Inc., Well Servicing Pump, Model GD-25000, GD0-25000-HD, Quintuplex Pumps; GWS Fluid End Parts List, 302FWF997 Rev H, Jul. 2008, 39 pages, Tulsa, OK USA.

Gardner Denver, Inc., Well Servicing Pump, Model GD-25000 Quintuplex, Operating and Service Manual, 300FWF996 Revision F, Apr. 2011, 50 pages, Tulsa, OK USA.

Gardner Denver, Inc., Well Servicing Pump, Model GD-25000, GD-25000-HD, Quintuplex Pumps, Standard Fluid End Parts List, 301 FWF997 Rev J, Jul. 2011, 40 pages, Tulsa, OK USA.

Gardner Denver, Inc., Outline-Bare Unit, Nov. 2011, 1 page, Tulsa, OK USA.

Foreign Communication From a Related Counterpart Application, Canadian Application No. 2,835,904 Canadian Office Action dated Jan. 19, 2015, 4 pages.

Foreign Communication From a Related Counterpart Application, Canadian Application No. 2,845,347 Canadian Office Action dated Mar. 19, 2015, 4 pages.

* cited by examiner

MOBILE, MODULAR, ELECTRICALLY POWERED SYSTEM FOR USE IN FRACTURING UNDERGROUND FORMATIONS

CROSS REFERENCE TO RELATED APPLICATIONS

This application is a continuation of U.S. Non-Provisional application Ser. No. 13/441,334 filed on Apr. 6, 2012 by Todd Coli, et al. and entitled "MOBILE, MODULAR, ELECTRICALLY POWERED SYSTEM FOR USE IN FRACTURING UNDERGROUND FORMATIONS," which claims the benefit, and priority benefit, of U.S. Provisional Patent Application Ser. No. 61/472,861, filed Apr. 7, 2011, entitled "MOBILE, MODULAR, ELECTRICALLY POWERED SYSTEM FOR USE IN FRACTURING UNDERGROUND FORMATIONS," all of which are incorporated herein in their entirety.

BACKGROUND

1. Field of Invention

This invention relates generally to hydraulic stimulation of underground hydrocarbon-bearing formations, and more particularly, to the generation and use of electrical power to deliver fracturing fluid to a wellbore.

2. Description of the Related Art

Over the life cycle of a typical hydrocarbon-producing wellbore, various fluids (along with additives, proppants, gels, cement, etc. . . . ) can be delivered to the wellbore under pressure and injected into the wellbore. Surface pumping systems must be able to accommodate these various fluids. Such pumping systems are typically mobilized on skids or tractor-trailers and powered using diesel motors.

Technological advances have greatly improved the ability to identify and recover unconventional oil and gas resources. Notably, horizontal drilling and multi-stage fracturing have led to the emergence of new opportunities for natural gas production from shale formations. For example, more than twenty fractured intervals have been reported in a single horizontal wellbore in a tight natural gas formation. However, significant fracturing operations are required to recover these resources.

Currently contemplated natural gas recovery opportunities require considerable operational infrastructure, including large investments in fracturing equipment and related personnel. Notably, standard fluid pumps require large volumes of diesel fuel and extensive equipment maintenance programs. Typically, each fluid pump is housed on a dedicated truck and trailer configuration. With average fracturing operations requiring as many as fifty fluid pumps, the on-site area, or "footprint", required to accommodate these fracturing operations is massive. As a result, the operational infrastructure required to support these fracturing operations is extensive. Greater operational efficiencies in the recovery of natural gas would be desirable.

When planning large fracturing operations, one major logistical concern is the availability of diesel fuel. The excessive volumes of diesel fuel required necessitates constant transportation of diesel tankers to the site, and results in significant carbon dioxide emissions. Others have attempted to decrease fuel consumption and emissions by running large pump engines on "Bi-Fuel", blending natural gas and diesel fuel together, but with limited success. Further, attempts to decrease the number of personnel on-site by implementing remote monitoring and operational control have not been successful, as personnel are still required on-site to transport the equipment and fuel to and from the location.

SUMMARY

Various illustrative embodiments of a system and method for hydraulic stimulation of underground hydrocarbon-bearing formations are provided herein. In accordance with an aspect of the disclosed subject matter, a method of delivering fracturing fluid to a wellbore is provided. The method can comprise the steps of: providing a dedicated source of electric power at a site containing a wellbore to be fractured; providing one or more electric fracturing modules at the site, each electric fracturing module comprising an electric motor and a coupled fluid pump, each electric motor operatively associated with the dedicated source of electric power; providing a wellbore treatment fluid for pressurized delivery to a wellbore, wherein the wellbore treatment fluid can be continuous with the fluid pump and with the wellbore; and operating the fracturing unit using electric power from the dedicated source to pump the treatment fluid to the wellbore.

In certain illustrative embodiments, the dedicated source of electrical power is a turbine generator. A source of natural gas can be provided, whereby the natural gas drives the turbine generator in the production of electrical power. For example, natural gas can be provided by pipeline, or natural gas produced on-site. Liquid fuels such as condensate can also be provided to drive the turbine generator.

In certain illustrative embodiments, the electric motor can be an AC permanent magnet motor and/or a variable speed motor. The electric motor can be capable of operation in the range of up to 1500 rpms and up to 20,000 ft/lbs of torque. The pump can be a triplex or quintiplex plunger style fluid pump.

In certain illustrative embodiments, the method can further comprise the steps of: providing an electric blender module continuous and/or operatively associated with the fluid pump, the blender module comprising: a fluid source, a fluid additive source, and a centrifugal blender tub, and supplying electric power from the dedicated source to the blender module to effect blending of the fluid with fluid additives to generate the treatment fluid.

In accordance with another aspect of the disclosed subject matter, a system for use in delivering pressurized fluid to a wellbore is provided. The system can comprise: a well site comprising a wellbore and a dedicated source of electricity; an electrically powered fracturing module operatively associated with the dedicated source of electricity, the electrically powered fracturing module comprising an electric motor and a fluid pump coupled to the electric motor; a source of treatment fluid, wherein the treatment fluid can be continuous with the fluid pump and with the wellbore; and a control system for regulating the fracturing module in delivery of treatment fluid from the treatment fluid source to the wellbore.

In certain illustrative embodiments, the source of treatment fluid can comprise an electrically powered blender module operatively associated with the dedicated source of electricity. The system can further comprise a fracturing trailer at the well site for housing one or more fracturing modules. Each fracturing module can be adapted for removable mounting on the trailer. The system can further comprise a replacement pumping module comprising a pump and an electric motor, the replacement pumping module adapted for removable mounting on the trailer. In certain illustrative embodiments, the replacement pumping module can be a nitrogen pumping module, or a carbon dioxide pumping module. The replacement pumping module can be, for example, a high torque, low rate motor or a low torque, high rate motor.

In accordance with another aspect of the disclosed subject matter, a fracturing module for use in delivering pressurized fluid to a wellbore is provided. The fracturing module can comprise: an AC permanent magnet motor capable of operation in the range of up to 1500 rpms and up to 20,000 ft/lbs of torque; and a plunger-style fluid pump coupled to the motor.

In accordance with another aspect of the disclosed subject matter, a method of blending a fracturing fluid for delivery to a wellbore to be fractured is provided. A dedicated source of electric power can be provided at a site containing a wellbore to be fractured. At least one electric blender module can be provided at the site. The electric blender module can include a fluid source, a fluid additive source, and a blender tub. Electric power can be supplied from the dedicated source to the electric blender module to effect blending of a fluid from the fluid source with a fluid additive from the fluid additive source to generate the fracturing fluid. The dedicated source of electrical power can be a turbine generator. A source of natural gas can be provided, wherein the natural gas is used to drive the turbine generator in the production of electrical power. The fluid from the fluid source can be blended with the fluid additive from the fluid additive source in the blender tub. The electric blender module can also include at least one electric motor that is operatively associated with the dedicated source of electric power and that effects blending of the fluid from the fluid source with the fluid additive from the fluid additive source.

In certain illustrative embodiments, the electric blender module can include a first electric motor and a second electric motor, each of which is operatively associated with the dedicated source of electric power. The first electric motor can affect delivery of the fluid from the fluid source to the blending tub. The second electric motor can effect blending of the fluid from the fluid source with the fluid additive from the fluid additive source in the blending tub. In certain illustrative embodiments, an optional third electric motor may also be present that can also be operatively associated with the dedicated source of electric power. The third electric motor can affect delivery of the fluid additive from the fluid additive source to the blending tub.

In certain illustrative embodiments, the electric blender module can include a first blender unit and a second blender unit, each disposed adjacent to the other on the blender module and each capable of independent operation, or collectively capable of cooperative operation, as desired. The first blender unit and the second blender unit can each include a fluid source, a fluid additive source, and a blender tub. The first blender unit and the second blender unit can each have at least one electric motor that is operatively associated with the dedicated source of electric power and that effects blending of the fluid from the fluid source with the fluid additive from the fluid additive source. Alternatively, the first blender unit and the second blender unit can each have a first electric motor and a second electric motor, both operatively associated with the dedicated source of electric power, wherein the first electric motor effects delivery of the fluid from the fluid source to the blending tub and the second electric motor effects blending of the fluid from the fluid source with the fluid additive from the fluid additive source in the blending tub. In certain illustrative embodiments, the first blender unit and the second blender unit can each also have a third electric motor operatively associated with the dedicated source of electric power, wherein the third electric motor effects delivery of the fluid additive from the fluid additive source to the blending tub.

In accordance with another aspect of the disclosed subject matter, an electric blender module for use in delivering a blended fracturing fluid to a wellbore is provided. The electric blender module can include a first electrically driven blender unit and a first inlet manifold coupled to the first electrically driven blender unit and capable of delivering an unblended fracturing fluid thereto. A first outlet manifold can be coupled to the first electrically driven blender unit and can be capable of delivering the blended fracturing fluid away therefrom. A second electrically driven blender unit can be provided. A second inlet manifold can be coupled to the second electrically driven blender unit and capable of delivering the unblended fracturing fluid thereto. A second outlet manifold can be coupled to the second electrically driven blender unit and can be capable of delivering the blended fracturing fluid away therefrom. An inlet crossing line can be coupled to both the first inlet manifold and the second inlet manifold and can be capable of delivering the unblended fracturing fluid there between. An outlet crossing line can be coupled to both the first outlet manifold and the second outlet manifold and can be capable of delivering the blended fracturing fluid there between. A skid can be provided for housing the first electrically driven blender unit, the first inlet manifold, the second electrically driven blender unit, and the second inlet manifold.

Other aspects and features of the present invention will become apparent to those of ordinary skill in the art upon review of the following detailed description in conjunction with the accompanying figures.

BRIEF DESCRIPTION OF THE DRAWINGS

A better understanding of the presently disclosed subject matter can be obtained when the following detailed description is considered in conjunction with the following drawings, wherein.

DETAILED DESCRIPTION

The presently disclosed subject matter generally relates to an electrically powered fracturing system and a system and method for providing on-site electrical power and delivering fracturing fluid to a wellbore at a fracturing operation.

In a conventional fracturing operation, a "slurry" of fluids and additives is injected into a hydrocarbon bearing rock formation at a wellbore to propagate fracturing. Low pressure fluids are mixed with chemicals, sand, and, if necessary, acid, and then transferred at medium pressure and high rate to vertical and/or deviated portions of the wellbore via multiple high pressure, plunger style pumps driven by diesel fueled prime movers. The majority of the fluids injected will be flowed back through the wellbore and recovered, while the sand will remain in the newly created fracture, thus "propping" it open and providing a permeable membrane for hydrocarbon fluids and gases to flow through so they may be recovered.

According to the illustrative embodiments described herein, natural gas (either supplied to the site or produced on-site) can be used to drive a dedicated source of electrical power, such as a turbine generator, for hydrocarbon-producing wellbore completions. A scalable, electrically powered fracturing fleet is provided to deliver pressurized treatment fluid, such as fracturing fluid, to a wellbore in a fracturing operation, obviating the need for a constant supply of diesel fuel to the site and reducing the site footprint and infrastructure required for the fracturing operation, when compared with conventional operations. The treatment fluid provided for pressurized delivery to the wellbore can be continuous with the wellbore and with one or more components of the fracturing fleet, in certain illustrative embodiments. In these embodiments, continuous generally means that downhole hydrodynamics are dependent upon constant flow (rate and pressure) of the delivered fluids, and that there should not be any interruption in fluid flow during delivery to the wellbore if the fracture is to propagate as desired. However, it should not be interpreted to mean that operations of the fracturing fleet cannot generally be stopped and started, as would be understood by one of ordinary skill in the art.

Figure 1:
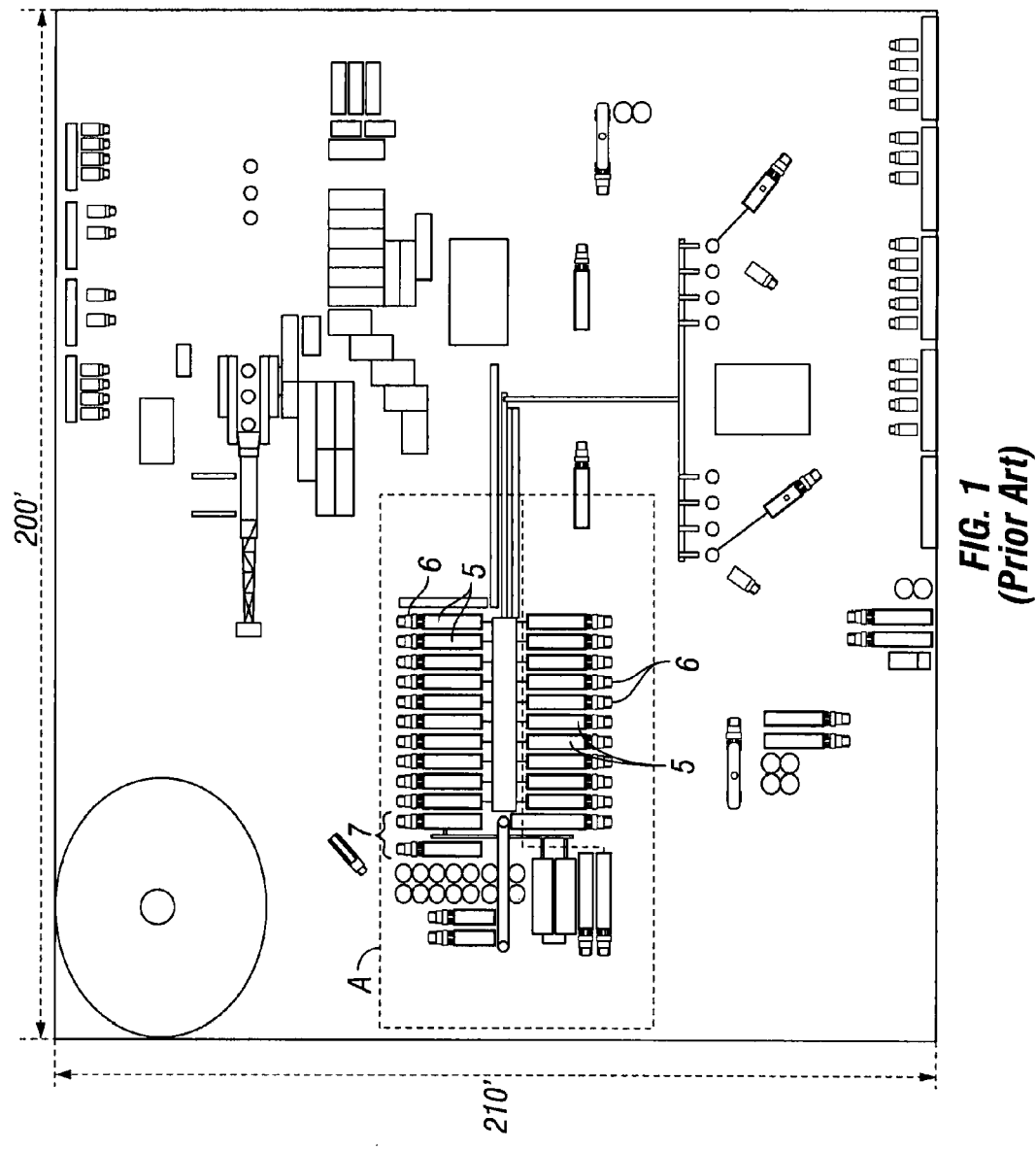
FIG. 1 is a schematic plan view of a traditional fracturing site.

With reference to FIG. 1, a site plan for a traditional fracturing operation on an onshore site is shown. Multiple trailers 5 are provided, each having at least one diesel tank mounted or otherwise disposed thereon. Each trailer 5 is attached to a truck 6 to permit refueling of the diesel tanks as required. Trucks 6 and trailers 5 are located within region A on the fracturing site. Each truck 6 requires a dedicated operator. One or more prime movers are fueled by the diesel and are used to power the fracturing operation. One or more separate chemical handling skids 7 are provided for housing of blending tanks and related equipment.

Figure 2:
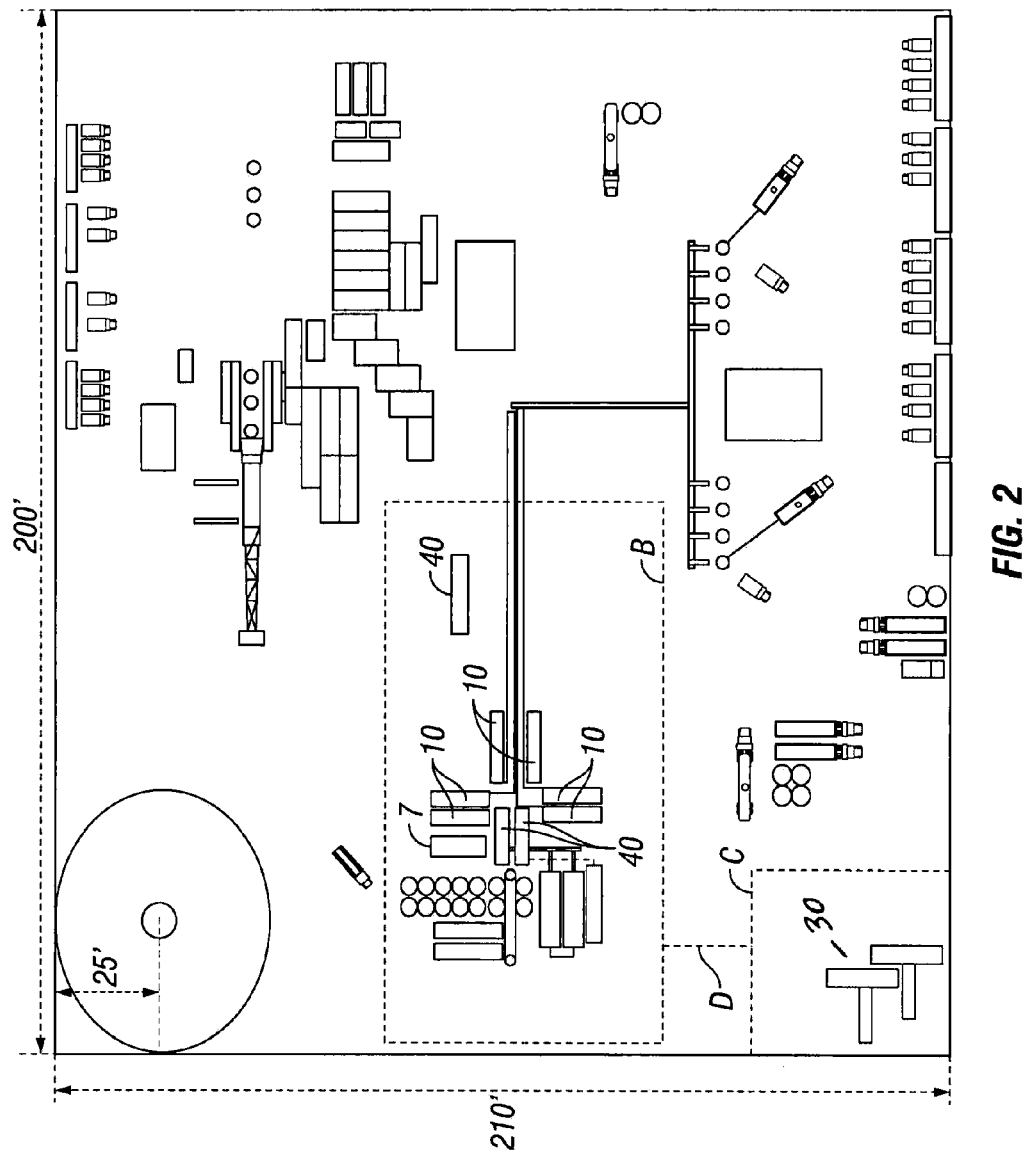
FIG. 2 is a schematic plan view of a fracturing site in accordance with certain illustrative embodiments described herein.

With reference to FIG. 2, an illustrative embodiment of a site plan for an electrically powered fracturing operation on an onshore site is shown. The fracturing operation includes one or more trailers 10, each housing one or more fracturing modules 20 (see FIG. 3). Trailers 10 are located in region B on the fracturing site. One or more natural gas-powered turbine generators 30 are located in region C on the site, which is located a remote distance D from region B where the trailers 10 and fracturing modules 20 are located, for safety reasons. Turbine generators 30 replace the diesel prime movers utilized in the site plan of FIG. 1. Turbine generators 30 provide a dedicated source of electric power on-site. There is preferably a physical separation between the natural gas-based power generation in region C and the fracturing operation and wellbore located in region B. The natural gas-based power generation can require greater safety precautions than the fracturing operation and wellhead. Accordingly, security measures can be taken in region C to limit access to this more hazardous location, while maintaining separate safety standards in region B where the majority of site personnel are typically located. Further, the natural gas powered supply of electricity can be monitored and regulated remotely such that, if desired, no personnel are required to be within region C during operation.

Notably, the setup of FIG. 2 requires significantly less infrastructure than the setup shown in FIG. 1, while providing comparable pumping capacity. Fewer trailers 10 are present in region B of FIG. 2 than the trucks 6 and trailers 5 in region A of FIG. 1, due to the lack of need for a constant diesel fuel supply. Further, each trailer 10 in FIG. 2 does not need a dedicated truck 6 and operator as in FIG. 1. Fewer chemical handling skids 7 are required in region B of FIG. 2 than in region A of FIG. 1, as the skids 7 in FIG. 2 can be electrically powered. Also, by removing diesel prime movers, all associated machinery necessary for power transfer can be eliminated, such as the transmission, torque converter, clutch, drive shaft, hydraulic system, etc. . . . , and the need for cooling systems, including circulating pumps and fluids, is significantly reduced. In an illustrative embodiment, the physical footprint of the on-site area in region B of FIG. 2 is about 80% less than the footprint for the conventional system in region A of FIG. 1.

Figure 3:
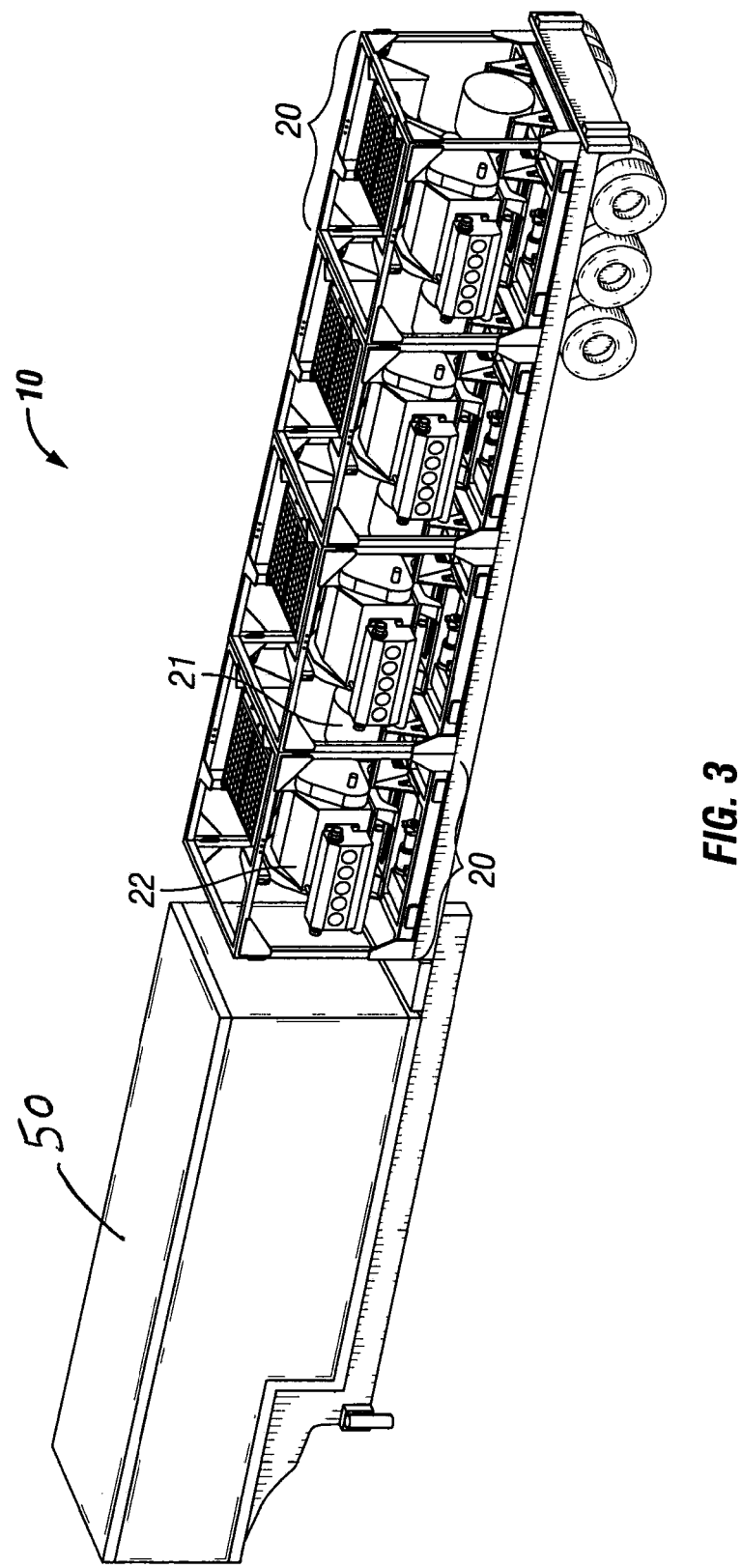
FIG. 3 is a schematic perspective view of a fracturing trailer in accordance with certain illustrative embodiments described herein.

With reference to the illustrative embodiments of FIG. 3, trailer 10 for housing one or more fracturing modules 20 is shown. Trailer 10 can also be a skid, in certain illustrative embodiments. Each fracturing module 20 can include an electric motor 21 and a fluid pump 22 coupled thereto. During fracturing, fracturing module 20 is operatively associated with turbine generator 30 to receive electric power therefrom. In certain illustrative embodiments, a plurality of electric motors 21 and pumps 22 can be transported on a single trailer 10. In the illustrative embodiments of FIG. 3, four electric motors 21 and pumps 22 are transported on a single trailer 10. Each electric motor 21 is paired to a pump 22 as a single fracturing module 20. Each fracturing module 20 can be removably mounted to trailer 10 to facilitate ease of replacement as necessary. Fracturing modules 20 utilize electric power from turbine generator 30 to pump the fracturing fluid directly to the wellbore.

Electrical Power Generation

The use of a turbine to directly drive a pump has been previously explored. In such systems, a transmission is used to regulate turbine power to the pump to allow for speed and torque control. In the present operation, natural gas is instead used to drive a dedicated power source in the production of electricity. In illustrative embodiments, the dedicated power source is an on-site turbine generator. The need for a transmission is eliminated, and generated electricity can be used to power the fracturing modules, blenders, and other on-site operations as necessary.

Grid power may be accessible on-site in certain fracturing operations, but the use of a dedicated power source is preferred. During startup of a fracturing operation, massive amounts of power are required such that the use of grid power would be impractical. Natural gas powered generators are more suitable for this application based on the likely availability of natural gas on-site and the capacity of natural gas generators for producing large amounts of power. Notably, the potential for very large instantaneous adjustments in power drawn from the grid during a fracturing operation could jeopardize the stability and reliability of the grid power system. Accordingly, a site-generated and dedicated source of electricity provides a more feasible solution in powering an electric fracturing system. In addition, a dedicated on-site operation can be used to provide power to operate other local equipment, including coiled tubing systems, service rigs, etc. . . . .

In an illustrative embodiment, a single natural gas powered turbine generator 30, as housed in a restricted area C of FIG. 2, can generate sufficient power (for example 31 MW at 13,800 volts AC power) to supply several electric motors 21 and pumps 22, avoiding the current need to deliver and operate each fluid pump from a separate diesel-powered truck. A turbine suitable for this purpose is a TM2500+ turbine generator sold by General Electric. Other generation packages could be supplied by Pratt & Whitney or Kawasaki for example. Multiple options are available for turbine power generation, depending on the amount of electricity required. In an illustrative embodiment, liquid fuels such as condensate can also be provided to drive turbine generator 30 instead of, or in addition to, natural gas. Condensate is less expensive than diesel fuels, thus reducing operational costs.

Fracturing Module

Figure 4A:
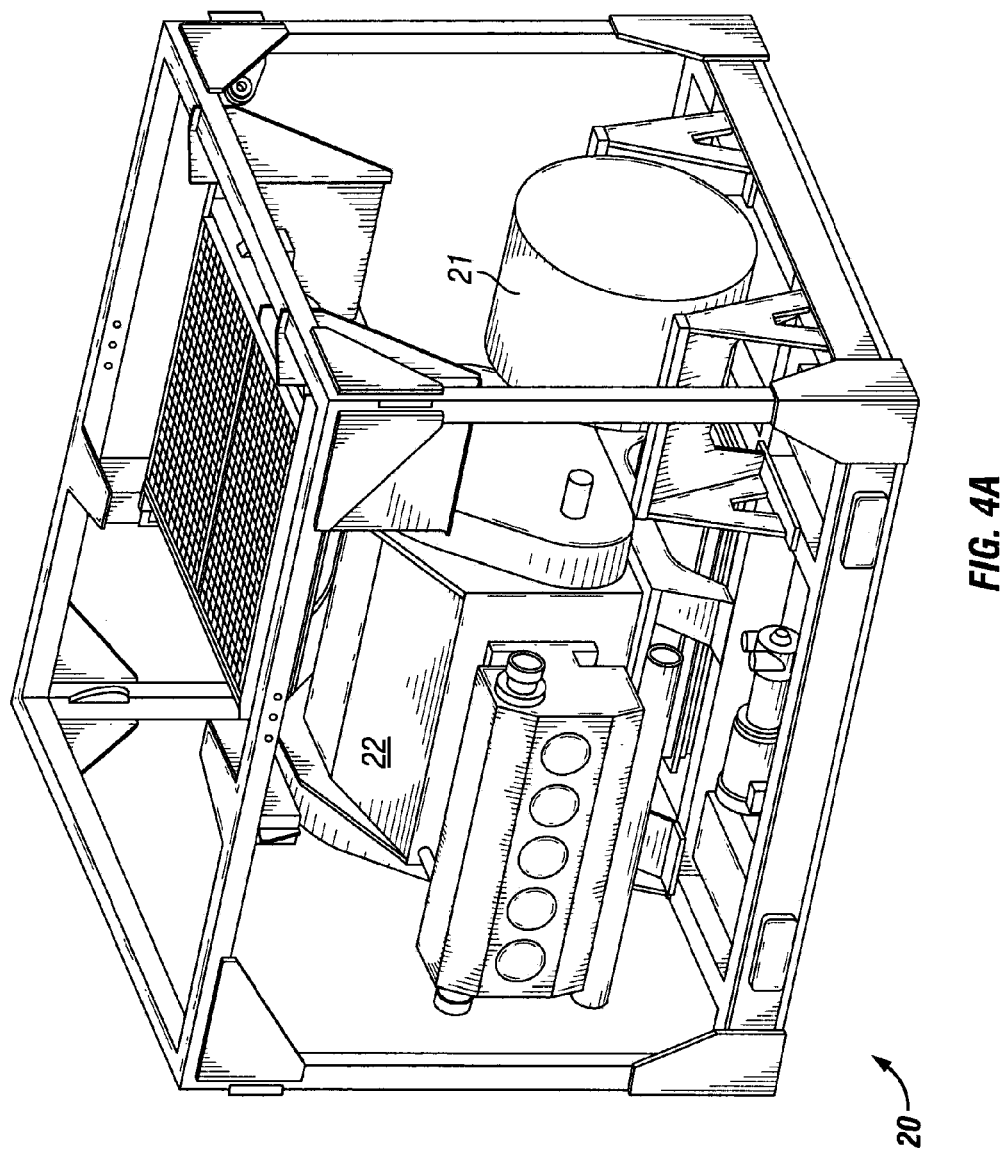
FIG. 4A is a schematic perspective view of a fracturing module in accordance with certain illustrative embodiments described herein.
Figure 4B:
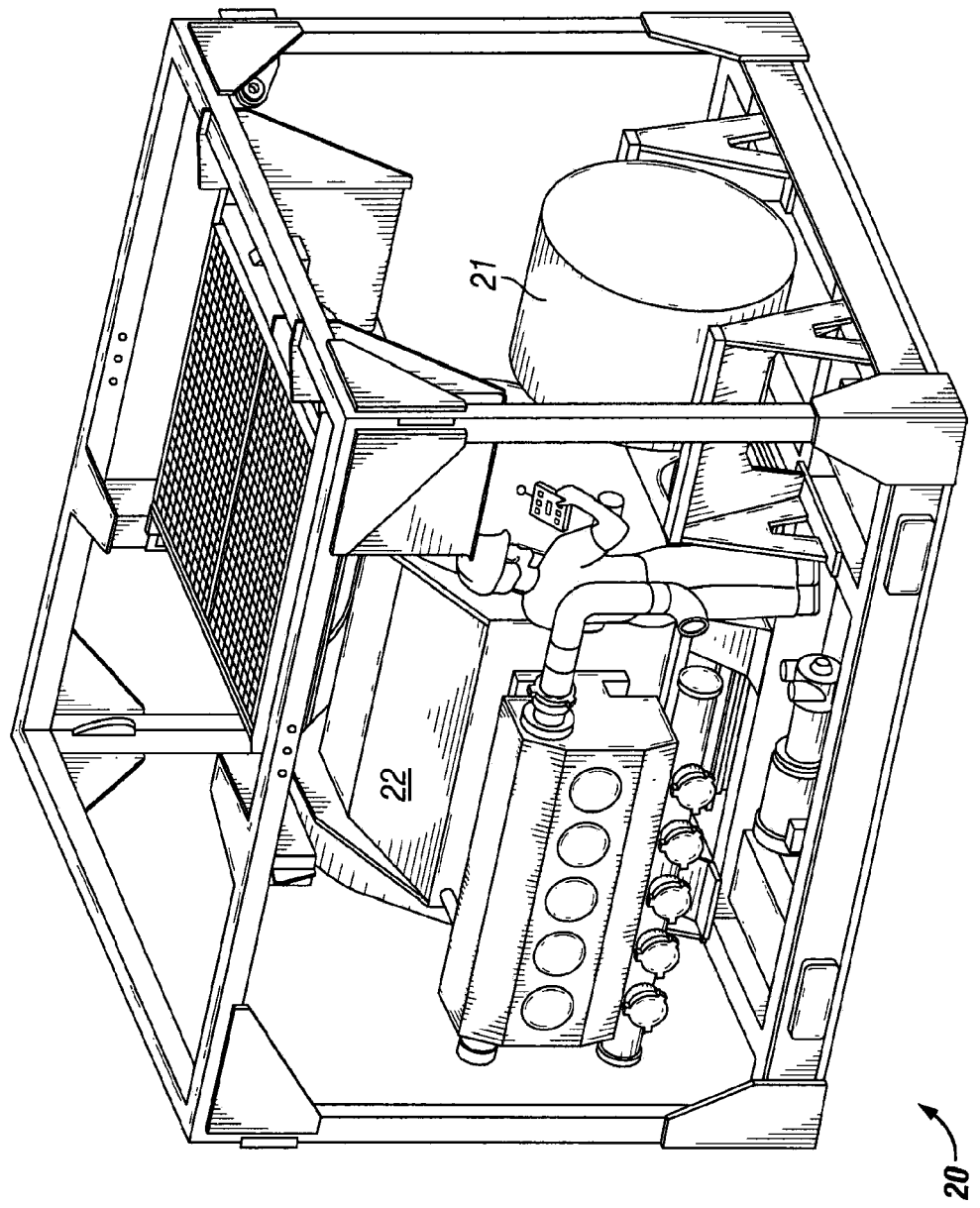
FIG. 4B is a schematic perspective view of a fracturing module with maintenance personnel in accordance with certain illustrative embodiments described herein.
Figure 5A:
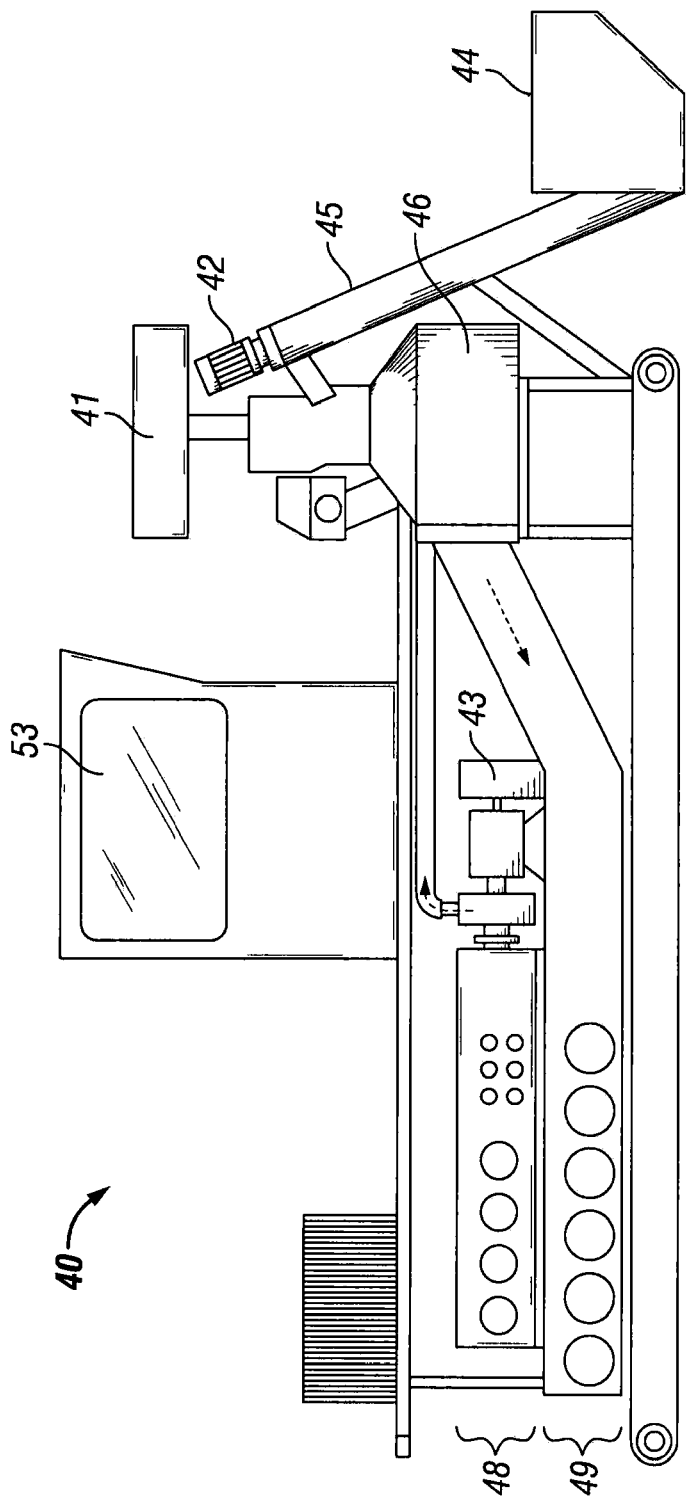
FIG. 5A is a schematic side view of a blender module in accordance with certain illustrative embodiments described herein.
Figure 5B:
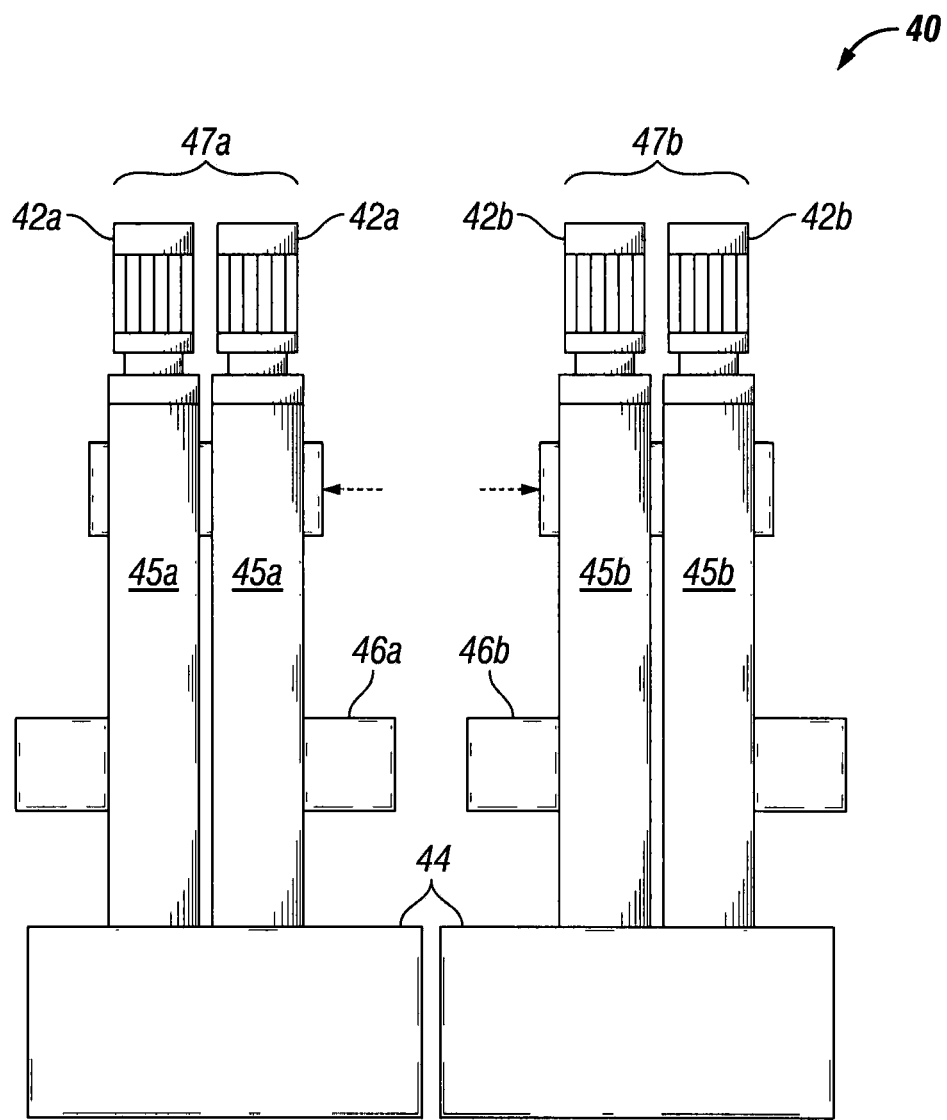
FIG. 5B is an end view of the blender module shown in FIG. 4A.
Figure 5C:
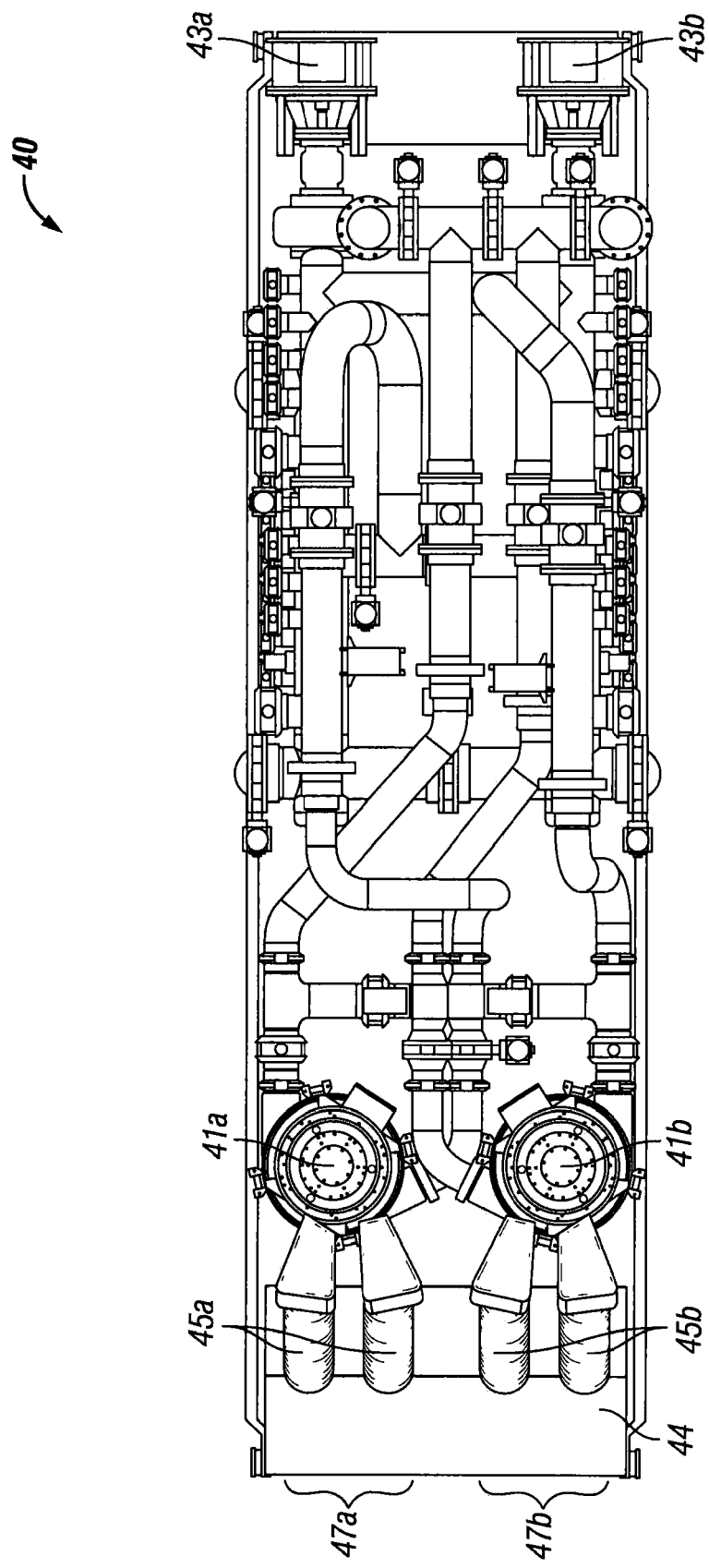
FIG. 5C is a schematic top view of a blender module in accordance with certain illustrative embodiments described herein.
Figure 5D:
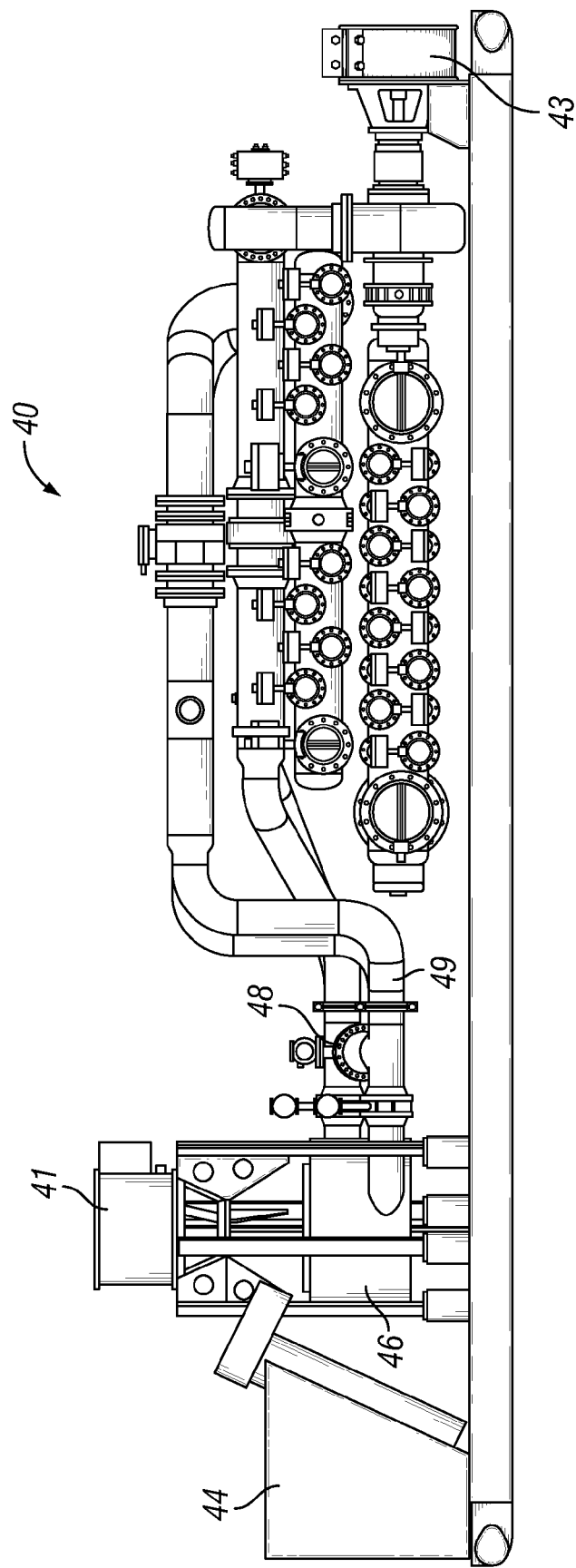
FIG. 5D is a schematic side view of the blender module shown in FIG. 5C.
Figure 5E:
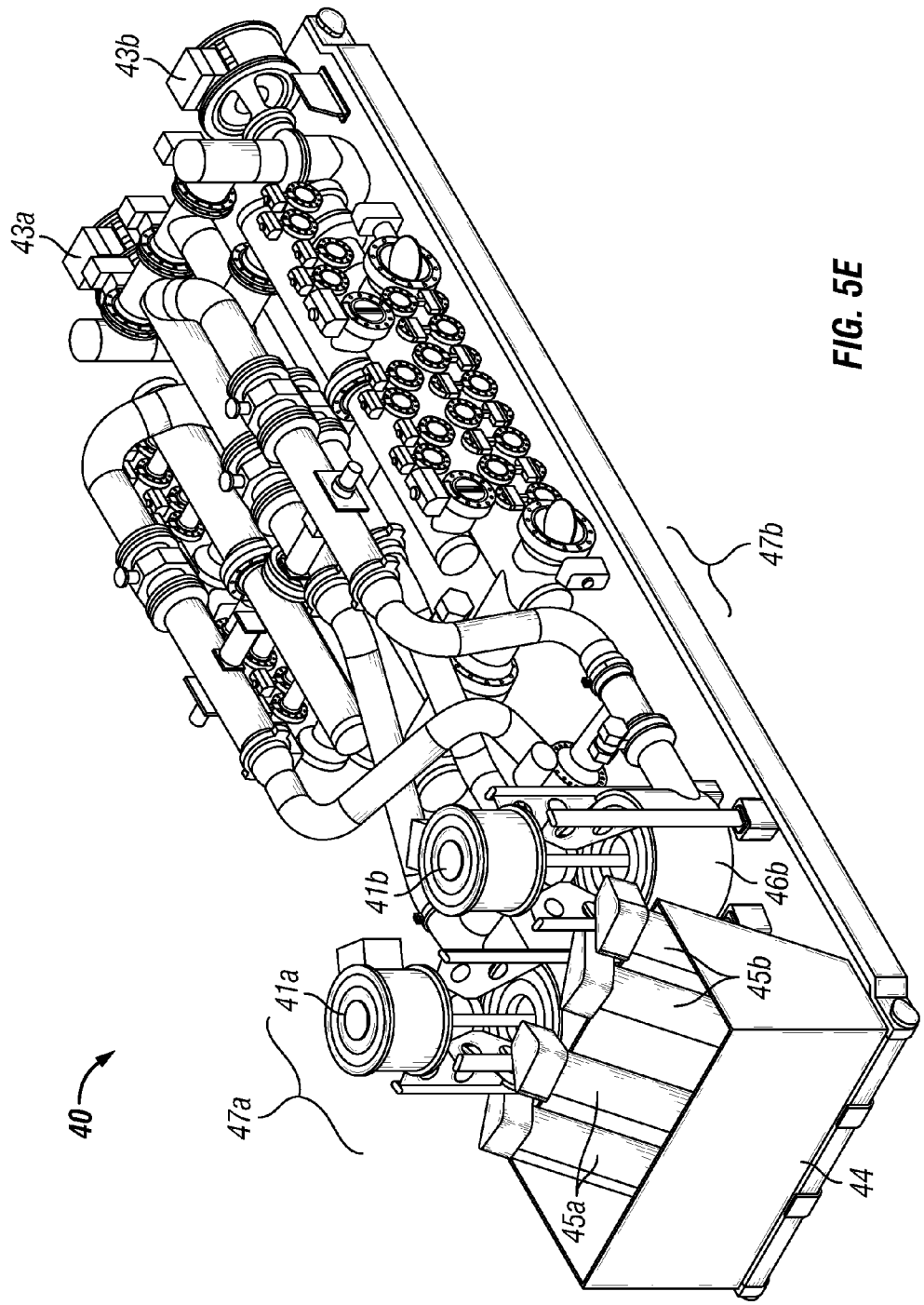
FIG. 5E is a schematic perspective view of the blender module shown in FIG. 5C.
Figure 6:
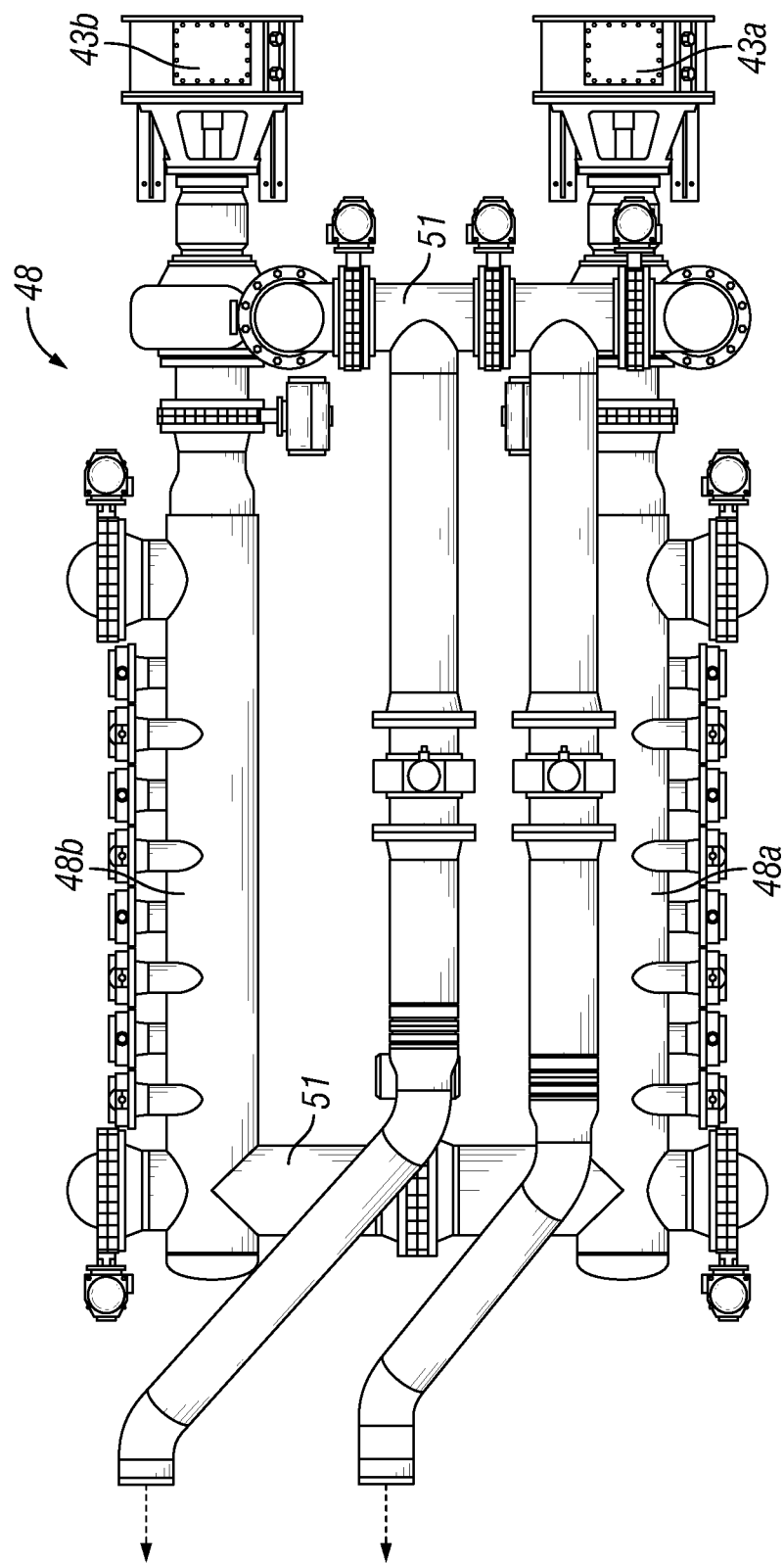
FIG. 6 is a schematic top view of an inlet manifold for a blender module in accordance with certain illustrative embodiments described herein.
Figure 7:
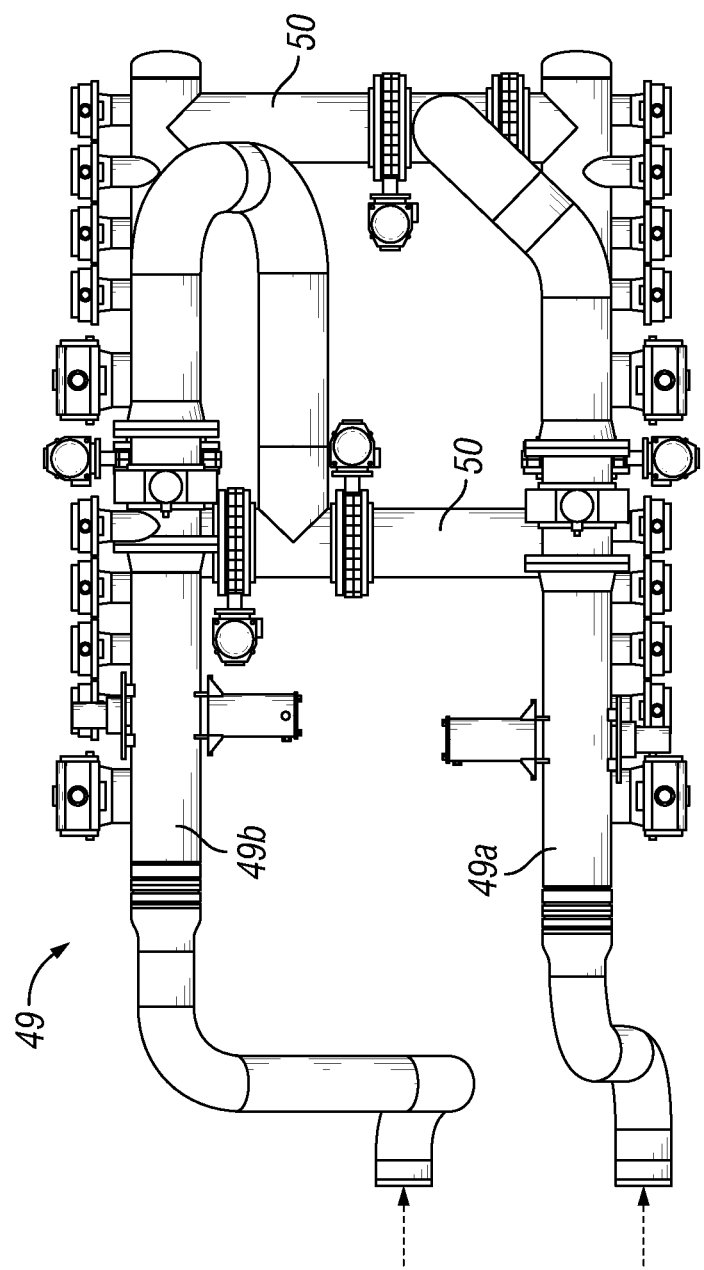
FIG. 7 is a schematic top view of an outlet manifold for a blender module in accordance with certain illustrative embodiments described herein.

With reference to FIGS. 4A and 4B, an illustrative embodiment of fracturing module 20 is provided. Fracturing module 20 can include an electric motor 21 coupled to one or more electric pumps 22, in certain illustrative embodiments. A suitable pump is a quintiplex or triplex plunger style pump, for example, the SWGS-2500 Well Service Pump sold by Gardner Denver, Inc.

Electric motor 21 is operatively associated with turbine generator 30, in certain embodiments. Typically, each fracturing module 20 will be associated with a drive housing for controlling electric motor 21 and pumps 22, as well as an electrical transformer and drive unit 50 (see FIG. 3) to step down the voltage of the power from turbine generator 30 to a voltage appropriate for electric motor 21. The electrical transformer and drive unit 50 can be provided as an independent unit for association with fracturing module 20, or can be permanently fixed to the trailer 10, in various embodiments. If permanently fixed, then transformer and drive unit 50 can be scalable to allow addition or subtraction of pumps 22 or other components to accommodate any operational requirements.

Each pump 22 and electric motor 21 are modular in nature so as to simplify removal and replacement from fracturing module 20 for maintenance purposes. Removal of a single fracturing module 20 from trailer 10 is also simplified. For example, any fracturing module 20 can be unplugged and unpinned from trailer 10 and removed, and another fracturing module 20 can be installed in its place in a matter of minutes.

In the illustrative embodiment of FIG. 3, trailer 10 can house four fracturing modules 20, along with a transformer and drive unit 50. In this particular configuration, each single trailer 10 provides more pumping capacity than four of the traditional diesel powered fracturing trailers 5 of FIG. 1, as parasitic losses are minimal in the electric fracturing system compared to the parasitic losses typical of diesel fueled systems. For example, a conventional diesel powered fluid pump is rated for 2250 hp. However, due to parasitic losses in the transmission, torque converter and cooling systems, diesel fueled systems typically only provide 1800 hp to the pumps. In contrast, the present system can deliver a true 2500 hp directly to each pump 22 because pump 22 is directly coupled to electric motor 21. Further, the nominal weight of a conventional fluid pump is up to 120,000 lbs. In the present operation, each fracturing module 20 weighs approximately 28,000 lbs., thus allowing for placement of four pumps 22 in the same physical dimension (size and weight) as the spacing needed for a single pump in conventional diesel systems, as well as allowing for up to 10,000 hp total to the pumps. In other embodiments, more or fewer fracturing modules 20 may be located on trailer 10 as desired or required for operational purposes.

In certain illustrative embodiments, fracturing module 20 can include an electric motor 21 that is an AC permanent magnet motor capable of operation in the range of up to 1500 rpms and up to 20,000 ft/lbs of torque. Fracturing module 20 can also include a pump 22 that is a plunger-style fluid pump coupled to electric motor 21. In certain illustrative embodiments, fracturing module 20 can have dimensions of approximately 136" width×108" length×100" height. These dimensions would allow fracturing module 20 to be easily portable and fit with an ISO intermodal container for shipping purposes without the need for disassembly. Standard sized ISO container lengths are typically 20', 40' or 53'. In certain illustrative embodiments, fracturing module 20 can have dimensions of no greater than 136" width×108" length×100" height. These dimensions for fracturing module 20 would also allow crew members to easily fit within the confines of fracturing module 20 to make repairs, as illustrated in FIG. 4b. In certain illustrative embodiments, fracturing module 20 can have a width of no greater than 102" to fall within shipping configurations and road restrictions. In a specific embodiment, fracturing module 20 is capable of operating at 2500 hp while still having the above specified dimensions and meeting the above mentioned specifications for rpms and ft/lbs of torque.

Electric Motor

With reference to the illustrative embodiments of FIGS. 2 and 3, a medium low voltage AC permanent magnet electric motor 21 receives electric power from turbine generator 30, and is coupled directly to pump 22. In order to ensure suitability for use in fracturing, electric motor 21 should be capable of operation up to 1,500 rpm with a torque of up to 20,000 ft/lbs, in certain illustrative embodiments. A motor suitable for this purpose is sold under the trademark Tera-Torq® and is available from Comprehensive Power, Inc. of Marlborough, Mass. A compact motor of sufficient torque will allow the number of fracturing modules 20 placed on each trailer 10 to be maximized.

Blender

For greater efficiency, conventional diesel powered blenders and chemical addition units can be replaced with electrically powered blender units. In certain illustrative embodiments as described herein, the electrically powered blender units can be modular in nature for housing on trailer 10 in place of fracturing module 20, or housed independently for association with each trailer 10. An electric blending operation permits greater accuracy and control of fracturing fluid additives. Further, the centrifugal blender tubs typically used with blending trailers to blend fluids with proppant, sand, chemicals, acid, etc. . . . prior to delivery to the wellbore are a common source of maintenance costs in traditional fracturing operations.

With reference to FIGS. 5A-5E and FIGS. 6-7, illustrative embodiments of a blender module 40 and components thereof are provided. Blender module 40 can be operatively associated with turbine generator 30 and capable of providing fractioning fluid to pump 22 for delivery to the wellbore. In certain embodiments, blender module 40 can include at least one fluid additive source 44, at least one fluid source 48, and at least one centrifugal blender tub 46. Electric power can be supplied from turbine generator 30 to blender module 40 to effect blending of a fluid from fluid source 48 with a fluid additive from fluid additive source 44 to generate the fracturing fluid. In certain embodiments, the fluid from fluid source 48 can be, for example, water, oils or methanol blends, and the fluid additive from fluid additive source 44 can be, for example, friction reducers, gellents, gellent breakers or biocides.

In certain illustrative embodiments, blender module 40 can have a dual configuration, with a first blender unit 47a and a second blender unit 47b positioned adjacent to each other. This dual configuration is designed to provide redundancy and to facilitate access for maintenance and replacement of components as needed. In certain embodiments, each blender unit 47a and 47b can have its own electrically-powered suction and tub motors disposed thereon, and optionally, other electrically-powered motors can be utilized for chemical additional and/or other ancillary operational functions, as discussed further herein.

For example, in certain illustrative embodiments, first blender unit 47a can have a plurality of electric motors including a first electric motor 43a and a second electric motor 41a that are used to drive various components of blender module 40. Electric motors 41a and 43a can be powered by turbine generator 30. Fluid can be pumped into blender module 40 through an inlet manifold 48a by first electric motor 43a and added to tub 46a. Thus, first electric motor 43a acts as a suction motor. Second electric motor 41a can drive the centrifugal blending process in tub 46a. Second electric motor 41a can also drive the delivery of blended fluid out of blender module 40 and to the wellbore via an outlet manifold 49a. Thus, second electric motor 41a acts as a tub motor and a discharge motor. In certain illustrative embodiments, a third electric motor 42a can also be provided. Third electric motor 42a can also be powered by turbine generator 30, and can power delivery of fluid additives to blender 46a. For example, proppant from a hopper 44a can be delivered to a blender tub 46a, for example, a centrifugal blender tub, by an auger 45a, which is powered by third electric motor 42a.

Similarly, in certain illustrative embodiments, second blender unit 47b can have a plurality of electric motors including a first electric motor 43b and a second electric motor 41b that are used to drive various components of blender module 40. Electric motors 41b and 43b can be powered by turbine generator 30. Fluid can be pumped into blender module 40 through an inlet manifold 48b by first electric motor 43b and added to tub 46b. Thus, second electric motor 43a acts as a suction motor. Second electric motor 41b can drive the centrifugal blending process in tub 46b. Second electric motor 41b can also drive the delivery of blended fluid out of blender module 40 and to the wellbore via an outlet manifold 49b. Thus, second electric motor 41b acts as a tub motor and a discharge motor. In certain illustrative embodiments, a third electric motor 42b can also be provided. Third electric motor 42b can also be powered by turbine generator 30, and can power delivery of fluid additives to blender 46b. For example, proppant from a hopper 44b can be delivered to a blender tub 46b, for example, a centrifugal blender tub, by an auger 45b, which is powered by third electric motor 42b.

Blender module 40 can also include a control cabin 53 for housing equipment controls for first blender unit 47a and second blender unit 47b, and can further include appropriate drives and coolers as required.

Conventional blenders powered by a diesel hydraulic system are typically housed on a forty-five foot tractor trailer and are capable of approximately 100 bbl/min. In contrast, the dual configuration of blender module 40 having first blender unit 47a and second blender unit 47b can provide a total output capability of 240 bbl/min in the same physical footprint as a conventional blender, without the need for a separate backup unit in case of failure.

Redundant system blenders have been tried in the past with limited success, mostly due to problems with balancing weights of the trailers while still delivering the appropriate amount of power. Typically, two separate engines, each approximately 650 hp, have been mounted side by side on the nose of the trailer. In order to run all of the necessary systems, each engine must drive a mixing tub via a transmission, drop box and extended drive shaft. A large hydraulic system is also fitted to each engine to run all auxiliary systems such as chemical additions and suction pumps. Parasitic power losses are very large and the hosing and wiring is complex.

In contrast, the electric powered blender module 40 described in certain illustrative embodiments herein can relieve the parasitic power losses of conventional systems by direct driving each piece of critical equipment with a dedicated electric motor. Further, the electric powered blender module 40 described in certain illustrative embodiments herein allows for plumbing routes that are unavailable in conventional applications. For example, in certain illustrative embodiments, the fluid source can be an inlet manifold 48 that can have one or more inlet crossing lines 51 (see FIG. 6) that connect the section of inlet manifold 48 dedicated to delivering fluid to first blender unit 47a with the section of inlet manifold 48 dedicated to delivering fluid to second blender unit 47b. Similarly, in certain illustrative embodiments, outlet manifold 49 can have one or more outlet crossing lines 50 (see FIG. 7) that connect the section of outlet manifold 49 dedicated to delivering fluid from first blender unit 47a with the section of outlet manifold 49 dedicated to delivering fluid from second blender unit 47b. Crossing lines 50 and 51 allow flow to be routed or diverted between first blender unit 47a and second blender unit 47b. Thus, blender module 40 can mix from either side, or both sides, and/or discharge to either side, or both sides, if necessary. As a result, the attainable rates for the electric powered blender module 40 are much larger that of a conventional blender. In certain illustrative embodiments, each side (i.e., first blender unit 47a and second blender unit 47b) of blender module 40 is capable of approximately 120 bbl/min. Also, each side (i.e., first blender unit 47a and second blender unit 47b) can move approximately 15 t/min of sand, at least in part because the length of auger 45 is shorter (approximately 6') as compared to conventional units (approximately 12').

In certain illustrative embodiments, blender module 40 can be scaled down or "downsized" to a single, compact module comparable in size and dimensions to fracturing module 20 described herein. For smaller fracturing or treatment jobs requiring fewer than four fracturing modules 20, a downsized blender module 40 can replace one of the fracturing modules 20 on trailer 10, thus reducing operational costs and improving transportability of the system.

Control System

A control system can be provided for regulating various equipment and systems within the electric powered fractioning operation. For example, in certain illustrative embodiments, the control system can regulate fracturing module 20 in delivery of treatment fluid from blender module 30 to pumps 22 for delivery to the wellbore. Controls for the electric-powered operation described herein are a significant improvement over that of conventional diesel powered systems. Because electric motors are controlled by variable frequency drives, absolute control of all equipment on location can be maintained from one central point. When the system operator sets a maximum pressure for the treatment, the control software and variable frequency drives calculate a maximum current available to the motors. Variable frequency drives essentially "tell" the motors what they are allowed to do.

Electric motors controlled via variable frequency drive are far safer and easier to control than conventional diesel powered equipment. For example, conventional fleets with diesel powered pumps utilize an electronically controlled transmission and engine on the unit. There can be up to fourteen different parameters that need to be monitored and controlled for proper operation. These signals are typically sent via hardwired cable to an operator console controlled by the pump driver. The signals are converted from digital to analog so the inputs can be made via switches and control knobs. The inputs are then converted from analog back to digital and sent back to the unit. The control module on the unit then tells the engine or transmission to perform the required task and the signal is converted to a mechanical operation. This process takes time.

Accidental over-pressures are quite common in these conventional operations, as the signal must travel to the console, back to the unit and then perform a mechanical function. Over-pressures can occur in milliseconds due to the nature of the operations. These are usually due to human error, and can be as simple as a single operator failing to react to a command. They are often due to a valve being closed, which accidentally creates a "deadhead" situation.

For example, in January of 2011, a large scale fractioning operation was taking place in the Horn River Basin of northeastern British Columbia, Canada. A leak occurred in one of the lines and a shutdown order was given. The master valve on the wellhead was then closed remotely. Unfortunately, multiple pumps were still rolling and a system over-pressure ensued. Treating iron rated for 10,000 psi was taken to well over 15,000 psi. A line attached to the well also separated, causing it to whip around. The incident caused a shutdown interruption to the entire operation for over a week while investigation and damage assessment were performed.

The control system provided according to the present illustrative embodiments, being electrically powered, virtually eliminates these types of scenarios from occurring. A maximum pressure value set at the beginning of the operation is the maximum amount of power that can be sent to electric motor 21 for pump 22. By extrapolating a maximum current value from this input, electric motor 21 does not have the available power to exceed its operating pressure. Also, because there are virtually no mechanical systems between pump 22 and electric motor 21, there is far less "moment of inertia" of gears and clutches to deal with. A near instantaneous stop of electric motor 21 results in a near instantaneous stop of pump 22.

An electrically powered and controlled system as described herein greatly increases the ease in which all equipment can be synced or slaved to each other. This means a change at one single point will be carried out by all pieces of equipment, unlike with diesel equipment. For example, in conventional diesel powered operations, the blender typically supplies all the necessary fluids to the entire system. In order to perform a rate change to the operation, the blender must change rate prior to the pumps changing rates. This can often result in accidental overflow of the blender tubs and/or cavitation of the pumps due to the time lag of each piece of equipment being given manual commands.

In contrast, the present operation utilizes a single point control that is not linked solely to blender operations, in certain illustrative embodiments. All operation parameters can be input prior to beginning the fractioning. If a rate change is required, the system will increase the rate of the entire system with a single command. This means that if pumps 22 are told to increase rate, then blender module 40 along with the chemical units and even ancillary equipment like sand belts will increase rates to compensate automatically.

Suitable controls and computer monitoring for the entire fracturing operation can take place at a single central location, which facilitates adherence to pre-set safety parameters. For example, a control center 40 is indicated in FIG. 2 from which operations can be managed via communications link 41. Examples of operations that can be controlled and monitored remotely from control center 40 via communications link 41 can be the power generation function in Area B, or the delivery of treatment fluid from blender module 40 to pumps 22 for delivery to the wellbore.

Comparison Example

Table 1, shown below, compares and contrasts the operational costs and manpower requirements for a conventional diesel powered operation (such as shown in FIG. 1) with those of an electric powered operation (such as shown in FIG. 2).

TABLE 1

Comparison of Conventional Diesel Powered Operation vs. Electric Powered Operation

| Diesel Powered Operation | Electric Powered Operation |
| --- | --- |
| Total fuel cost (diesel) - about $80,000 per day | Total fuel cost (natural gas) - about $2,300 per day |
| Service interval for diesel engines - about every 200-300 hours | Service interval for electric motor - about every 50,000 hours |
| Dedicated crew size - about 40 people | Dedicated crew size - about 10 people |

In Table 1, the "Diesel Powered Operation" utilizes at least 24 pumps and 2 blenders, and requires at least 54,000 hp to execute the fracturing program on that location. Each pump burns approximately 300-400 liters per hour of operation, and the blender units burn a comparable amount of diesel fuel. Because of the fuel consumption and fuel capacity of this conventional unit, it requires refueling during operation, which is extremely dangerous and presents a fire hazard. Further, each piece of conventional equipment needs a dedicated tractor to move it and a driver/operator to run it. The crew size required to operate and maintain a conventional operation such as the one in FIG. 1 represents a direct cost for the site operator.

In contrast, the electric powered operation as described herein utilizes a turbine that only consumes about 6 mm scf of natural gas per 24 hours. At current market rates (approximately $2.50 per mmbtu), this equates to a reduction in direct cost to the site operator of over $77,000 per day compared to the diesel powered operation. Also, the service interval on electric motors is about 50,000 hours, which allows the majority of reliability and maintainability costs to disappear. Further, the need for multiple drivers/operators is reduced significantly, and electric powered operation means that a single operator can run the entire system from a central location. Crew size can be reduced by around 75%, as only about 10 people are needed on the same location to accomplish the same tasks as conventional operations, with the 10 people including off-site personnel maintenance personnel. Further, crew size does not change with the amount of equipment used. Thus, the electric powered operation is significantly more economical.

Modular Design and Alternate Embodiments

As discussed above, the modular nature of the electric powered fracturing operation described herein provides significant operational advantages and efficiencies over traditional fracturing systems. Each fracturing module 20 sits on trailer 10 which houses the necessary mounts and manifold systems for low pressure suctions and high pressure discharges. Each fracturing module 20 can be removed from service and replaced without shutting down or compromising the fractioning spread. For instance, pump 22 can be isolated from trailer 10, removed and replaced by a new pump 22 in just a few minutes. If fracturing module 20 requires service, it can be isolated from the fluid lines, unplugged, un-pinned and removed by a forklift. Another fracturing module 20 can be then re-inserted in the same fashion, realizing a drastic time savings. In addition, the removed fracturing module 20 can be repaired or serviced in the field. In contrast, if one of the pumps in a conventional diesel powered system goes down or requires service, the tractor/trailer combination needs to be disconnected from the manifold system and driven out of the location. A replacement unit must then be backed into the line and reconnected. Maneuvering these units in these tight confines is difficult and dangerous.

The presently described electric powered fracturing operation can be easily adapted to accommodate additional types of pumping capabilities as needed. For example, a replacement pumping module can be provided that is adapted for removable mounting on trailer 10. Replacement pumping module can be utilized for pumping liquid nitrogen, carbon dioxide, or other chemicals or fluids as needed, to increase the versatility of the system and broaden operational range and capacity. In a conventional system, if a nitrogen pump is required, a separate unit truck/trailer unit must be brought to the site and tied into the fractioning spread. In contrast, the presently described operation allows for a replacement nitrogen module with generally the same dimensions as fractioning module 20, so that the replacement module can fit into the same slot on the trailer as fracturing module 20 would. Trailer 10 can contain all the necessary electrical power distributions as required for a nitrogen pump module so no modifications are required. The same concept would apply to carbon dioxide pump modules or any other pieces of equipment that would be required. Instead of another truck/trailer, a specialized replacement module can instead be utilized.

Natural gas is considered to be the cleanest, most efficient fuel source available. By designing and constructing "fit for purpose equipment" that is powered by natural gas, it is expected that the fracturing footprint, manpower, and maintenance requirements can each be reduced by over 60% when compared with traditional diesel-powered operations.

In addition, the presently described electric powered fracturing operation resolves or mitigates environmental impacts of traditional diesel-powered operations. For example, the presently described natural gas powered operation can provide a significant reduction in carbon dioxide emissions as compared to diesel-powered operations. In an illustrative embodiment, a fractioning site utilizing the presently described natural gas powered operation would have a carbon dioxide emissions level of about 2200 kg/hr, depending upon the quality of the fuel gas, which represents an approximately 200% reduction from carbon dioxide emissions of diesel-powered operations. Also, in an illustrative embodiment, the presently described natural gas powered operation would produces no greater than about 80 decibels of sound with a silencer package utilized on turbine 30, which meets OSHA requirements for noise emissions. By comparison, a conventional diesel-powered fractioning pump running at full rpm emits about 105 decibels of sound. When multiple diesel-powered fractioning pumps are running simultaneously, noise is a significant hazard associated with conventional operations.

In certain illustrative embodiments, the electric-powered fractioning operation described herein can also be utilized for offshore oil and gas applications, for example, fracturing of a wellbore at an offshore site. Conventional offshore operations already possess the capacity to generate electric power on-site. These vessels are typically diesel over electric, which means that the diesel power plant on the vessel generates electricity to meet all power requirements including propulsion. Conversion of offshore pumping services to run from an electrical power supply will allow transported diesel fuel to be used in power generation rather than to drive the fracturing operation, thus reducing diesel fuel consumption. The electric power generated from the offshore vessel's power plant (which is not needed during station keeping) can be utilized to power one or more fracturing modules 10. This is far cleaner, safer and more efficient than using diesel powered equipment. Fracturing modules 10 are also smaller and lighter than the equipment typically used on the deck of offshore vessels, thus removing some of the current ballast issues and allowing more equipment or raw materials to be transported by the offshore vessels.

In a deck layout for a conventional offshore stimulation vessel, skid based, diesel powered pumping equipment and storage facilities on the deck of the vessel create ballast issues. Too much heavy equipment on the deck of the vessel causes the vessel to have higher center of gravity. Also, fuel lines must be run to each piece of equipment greatly increasing the risk of fuel spills. In illustrative embodiments of a deck layout for an offshore vessel utilizing electric-powered fractioning operations as described herein, the physical footprint of the equipment layout is reduced significantly when compared to the conventional layout. More free space is available on deck, and the weight of equipment is dramatically decreased, thus eliminating most of the ballast issues. A vessel already designed as diesel-electric can be utilized. When the vessel is on station at a platform and in station keeping mode, the vast majority of the power that the ship's engines are generating can be run up to the deck to power modules. The storage facilities on the vessel can be placed below deck, further lowering the center of gravity, while additional equipment, for instance, a 3-phase separator, or coiled tubing unit, can be provided on deck, which is difficult in existing diesel-powered vessels. These benefits, coupled with the electronic control system, give a far greater advantage over conventional vessels.

While the present description has specifically contemplated a fracturing system, the system can be used to power pumps for other purposes, or to power other oilfield equipment. For example, high rate and pressure pumping equipment, hydraulic fracturing equipment, well stimulation pumping equipment and/or well servicing equipment could also be powered using the present system. In addition, the system can be adapted for use in other art fields requiring high torque or high rate pumping operations, such as pipeline cleaning or dewatering mines.

It is to be understood that the subject matter herein is not limited to the exact details of construction, operation, exact materials, or illustrative embodiments shown and described, as modifications and equivalents will be apparent to one skilled in the art. Accordingly, the subject matter is therefore to be limited only by the scope of the appended claims.

What is claimed is:

1. A system for hydraulically fracturing an underground hydrocarbon bearing formation at a wellbore that pumps fluid from the wellbore into the formation, the system comprising:
 a plurality of pumps powered by one or more electric motors and fluidly connected to the wellbore, the pumps configured to pump fluid into the wellbore at a pressure sufficient so that the fluid passes from the wellbore into the formation, and fractures the formation, wherein a fracturing module comprises at least one of the pumps;
 at least one variable frequency drive connected to the one or more electric motors to control the speed of the motors, the at least one variable frequency drive capable of performing monitoring and controlling of the one or more electric motors; and
 one or more generators electrically connected to the plurality of pumps to provide electrical power to the pumps,
 wherein the fracturing module is mounted on a trailer connected to a manifold system, and
 wherein the trailer is configured to isolate the fracturing module from the trailer such that the fracturing module is adapted to be removed from the trailer without disconnecting the trailer from the manifold system for fracturing operations.

2. The system of claim 1, wherein the at least one variable frequency drive is capable of performing monitoring and controlling of the one or more electric motors by regulating a maximum current available to the one or more electric motors.

3. The system of claim 1, wherein at least some of the one or more generators are powered by a fuel selected from a group consisting of natural gas and liquid fuel.

4. The system of claim 1, wherein at least some of the one or more generators are turbine generators.

5. The system of claim 1, further comprising a control system configured to:
 sync one or more pumps of the plurality of pumps with an electric blender; and
 provide a single command that automatically compensates the change in flow rate of the electric blender based upon the change in flow rate of the one or more pumps of the plurality of pumps for fracturing operations.

6. The system of claim 1, wherein the plurality of pumps are mounted on the trailer and transportable on the trailer.

7. The system of claim 1, further comprising a plurality of variable frequency drives attached to the one or more electrical motors coupled to the plurality of pumps.

8. A system for fracturing an underground hydrocarbon bearing formation in an oil or gas well by pumping hydraulic fracturing fluid into the wellbore, the system comprising:
 at least one pump for pumping the hydraulic fracturing fluid into the wellbore, and then from the wellbore into the formation, the at least one pump mounted on a trailer and capable of pumping the hydraulic fracturing fluid at a pressure sufficient to crack the formation;
 an electric motor attached to the at least one pump and configured to drive the at least one pump, wherein a fracturing module comprises the electric motor;
 a variable frequency drive connected to the electric motor to control the speed of the motor, the variable frequency drive capable of performing monitoring and controlling of the electric motor; and
 a generator connected to the electric motor that provides electric power to the electric motor,
 wherein the fracturing module is mounted on the trailer connected to a manifold system, and
 wherein the trailer is configured to isolate the fracturing module from the trailer such that the fracturing module is adapted to be removed from the trailer without disconnecting the trailer from the manifold system for fracturing operations.

9. The system of claim 8, wherein the variable frequency drive is capable of performing monitoring and controlling of the electric motor by regulating a maximum current available to the electric motor.

10. The system of claim 8, wherein the at least one pump is a plunger-style fluid pump.

11. The system of claim 8, wherein the at least one pump is a triplex or a quintuplex pump rated up to about 2500 horsepower.

12. The system of claim 8, wherein the electric motor has a power output of up to about 2500 horsepower deliverable to the at least one pump.

13. The system of claim 8, wherein the electric motor has a torque of up to about 20,000 foot per pound (ft/lb) deliverable to the at least one pump.

14. The system of claim 8, wherein the generator is a turbine generator.

15. The system of claim 8, wherein the variable frequency drive is mounted to the trailer.

16. The system of claim 8, wherein the trailer has three axles.

17. The system of claim 8, wherein the trailer has mounts attaching the variable frequency drive to the trailer.

18. The system of claim 8, further comprising a control system configured to:
 sync the at least one pump with an electric blender; and
 provide a single command that automatically compensates the change in flow rate of the electric blender based upon the change in flow rate of the at least one pump for fracturing operations.

19. A system for hydraulically fracturing an underground hydrocarbon bearing formation at a wellbore that permits passage of fluid from the wellbore into the formation, the system comprising:
 a trailer;
 two or more pumps attached to the trailer and fluidly connected to the well, the pumps configured to pump fluid into the wellbore at a high pressure so that the fluid passes from the wellbore into the formation, and fractures the formation, wherein at least one of the pumps is configured to form a fracturing module;
 one or more electric motors attached to the pumps to drive the pumps;
 at least one variable frequency drive connected to the electric motors to control the speed of the motors, the at least one variable frequency drive capable of performing monitoring and controlling of the electric motors; and
 a generator for connection to the one or more electric motors that provides electric power to the one or more electric motors,
 wherein the fracturing module is mounted on the trailer connected to a manifold system, and
 wherein the trailer is configured to isolate the fracturing module from the trailer such that the fracturing module is adapted to be removed from the trailer without disconnecting the trailer from the manifold system for fracturing operations.

20. The system of claim 19, wherein the at least one variable frequency drive is capable of performing monitoring and controlling of the one or more electric motors by regulating a maximum current available to the one or more electric motors.

21. The system of claim 19, wherein the one or more electric motors are attached to the trailer.

22. The system of claim 19, further comprising a control system configured to:
- sync at least one of the two or more pumps with an electric blender; and
- provide a single command that automatically compensates the change in flow rate of the electric blender based upon the change in flow rate of the at least one of the two or more pumps for fracturing operations.

\* \* \* \* \*